(12) United States Patent
Jernström

(10) Patent No.: US 6,585,295 B2
(45) Date of Patent: *Jul. 1, 2003

(54) SAFETY BELT PRETENSIONER AND FORCE LIMITER

(75) Inventor: Clas Jernström, Askim (SE)

(73) Assignee: Volvo Car Corporation, Göteborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/682,752

(22) Filed: Oct. 12, 2001

(65) Prior Publication Data

US 2002/0056984 A1 May 16, 2002

(30) Foreign Application Priority Data

Oct. 12, 2000 (SE) .............................................. 0003682

(51) Int. Cl.[7] .............................................. B60R 22/46
(52) U.S. Cl. ..................... 280/806; 180/282; 242/374
(58) Field of Search ................................ 280/806, 807; 180/268, 273, 282; 242/374; 297/480

(56) References Cited

U.S. PATENT DOCUMENTS

| | | | | | |
|---|---|---|---|---|---|
| 5,505,399 A | * | 4/1996 | Schmid et al. | .............. | 242/374 |
| 5,794,876 A | * | 8/1998 | Morizane et al. | ........... | 242/374 |
| 6,340,176 B1 | * | 1/2002 | Webber et al. | .............. | 280/806 |
| 6,427,935 B1 | * | 8/2002 | Fujii et al. | .................. | 280/806 |

FOREIGN PATENT DOCUMENTS

| | | | | | |
|---|---|---|---|---|---|
| DE | 32 31 509 | * | 3/1984 | ................. | 242/374 |
| DE | 34 00 177 | * | 7/1985 | | |

* cited by examiner

Primary Examiner—Peter C. English
(74) Attorney, Agent, or Firm—Howrey, Simon, Arnold & White LLP

(57) ABSTRACT

A belt pretensioner and force limiter in a vehicle having a piston-cylinder device with a cylinder chamber containing an explosive charge in which the piston has a piston rod that protrudes from the cylinder and is joined to a cable. The cable, via a drum and a planetary gear set, drives a reel mechanism for the belt in a winding-up direction when the explosive charge is detonated. The planetary gear set is engaged so that the gear ratio is about 1:1 between the drum and the reel mechanism when the drum rotates in the winding-up direction. The planetary gear set is engaged in the opposite direction so that the return movement of the piston a certain distance in the cylinder corresponds to a several times longer feed-out of the web from the reel mechanism.

8 Claims, 5 Drawing Sheets

SAFETY BELT PRETENSIONER AND FORCE LIMITER

CROSS REFERENCE TO RELATED APPLICATIONS

The present application claims priority to Swedish Application No. 0003682-2, filed Oct. 12, 2000.

BACKGROUND OF INVENTION

1. Technical Field

The present invention relates to safety belt devices. More specifically, the invention relates to a device for pretensioning and force-limiting a safety belt web joined to a reel mechanism in a vehicle.

2. Background Information

Belt pretensioners with force limiters are presently used for safety belts in motor vehicles in order to take up slack between the belt windings on the spool of the reel mechanism in the event of a collision. At the same time, the pretensioners tighten up the belt against the body of the occupant so as to avoid as much as possible sliding under the belt or jerking, along with a possible accompanying whiplash. This force-limiting function is achieved by controlling the feeding-out of a predetermined length of the belt after pretensioning. This reduces the force between the occupant and the belt web up to the point when the occupant must be caught completely by the belt to prevent his head from hitting interior components such as the steering wheel of the vehicle.

As indicated above, force-limiting after pretensioning occurs when the belt is fed out due to occupant load on the belt caused by vehicle retardation. In a previously known design, force-limiting after pretensioning is achieved by plastic deformation of a torsion element in the reel mechanism. In practical embodiments at desired force levels, the maximum possible feed-out length of the belt is limited by design to approximately 300 mm. However, MADYMO simulations with 95 percentile dummy and 35 miles per hour crash velocity have demonstrated that belt feed-out length should be on the order of approximately 450 mm in order to achieve optimum effect. Accordingly, there is a need for a pretensioner that enables a greater belt feed-out length.

SUMMARY OF INVENTION

The present invention provides a device for pretensioning and force-limiting a safety belt web joined to a reel mechanism in a vehicle. The device includes a cylinder and a piston which is displaceable in the cylinder and has a piston rod. The piston rod is joined to one side of the piston and extends through an opening in one end wall of the cylinder. The device further includes a motion-transmitting element acting between the piston rod and the reel mechanism. The element is able to achieve rotation of the reel mechanism in the winding-up direction of the belt web upon displacement of the piston in one direction. The device also includes a pyrotechnic charge that, when detonated, causes a pressure increase in a cylinder chamber between the piston and a cylinder end wall, thereby displacing the piston in one direction.

A purpose of the present invention is to achieve a device of the type described above that makes possible controlled feed-out of the desired belt length of approximately 450 mm during the force-limiting phase. This is achieved according to the invention by joining the motion-transmitting element to a ring gear of a planetary gear set so that displacement of the piston in the cylinder results in rotation of the ring gear. The planetary gear set is so disposed and coupled to the reel mechanism that the gear ratio between the ring gear and the reel mechanism is about 1:1 upon rotation of the ring gear in the winding-up direction of the web. The gear set is further disposed and geared up upon rotation in the opposite direction so that movement of the piston over a certain distance in the cylinder corresponds to a several times longer feed-out of the web from the reel mechanism. By utilizing a planetary gear set, the desired belt feed-out length can be simply achieved by adapting the gear up of the planetary gear set to the stroke length of the piston and the desired belt feed-out length.

In a further embodiment of the device according to the invention, the cylinder chamber has an outlet that communicates with a spill valve. The spill valve can be set between various degrees of opening and is controlled by a control unit in response to signals from a sensor for sensing the weight of the occupant. The degree of valve opening determines the resistance against the return stroke of the piston during the force-limiting phase. This implies that the larger the valve opening is, the less will be the resisting force of the belt against the occupant. By regulating the valve opening in relation to the weight of the occupant, the force limitation is regulated relative to the weight of the occupant.

In yet a further embodiment of the device according to the invention, the spill valve can be set to a closed position. The control unit is in this case also coordinated with a positional, so-called roll-over sensor, which senses the position of the vehicle. If the sensor indicates that the vehicle is about to end up upside-down after the pretensioning phase, the control unit will close the valve, which means that the occupant will be held securely against the seat and no belt feed-out can occur. To assure that the piston remains in its position when the valve has been closed, in a preferred embodiment said cylinder chamber is delimited between the side of the piston opposite to the piston rod and the second end wall of the cylinder, the motion-transmitting element being arranged to rotate the reel mechanism in the winding-up direction of the belt when the piston is displaced in the protrusion direction of the piston rod. This provides an expansion space without a through-hole for the piston rod, which would otherwise be a potential path for leakage.

BRIEF DESCRIPTION OF DRAWINGS

The invention will now be described in more detail below with reference to examples shown in the accompanying drawings, where.

DETAILED DESCRIPTION

Figure 1A:
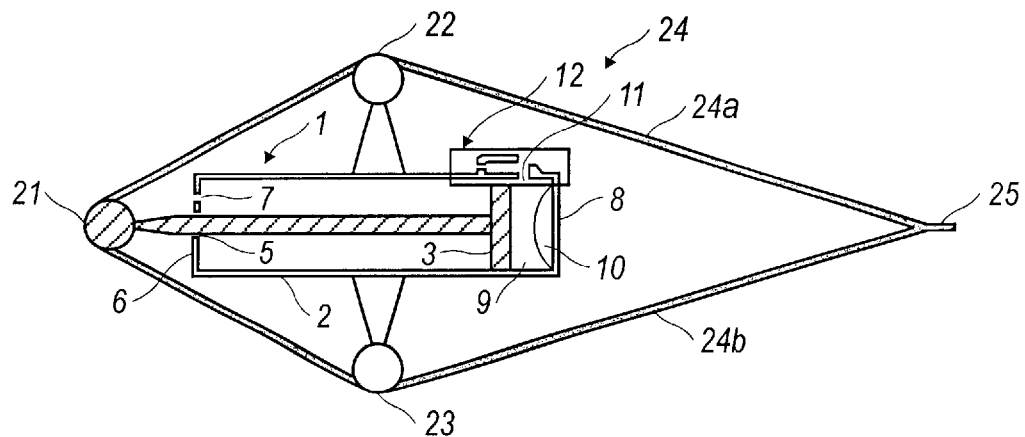
FIG. 1a shows a schematic longitudinal section through one embodiment of a piston-cylinder device with a valve and a motion-transmitting element according to the invention.

In FIG. 1a, reference 1 designates a piston-cylinder device with a cylinder 2 and a piston 3 displaceable in the cylinder. The piston 3 is joined to a piston rod 4, which extends through an opening 5 in one end wall 6 of the cylinder 2. The end wall also has a vent or ventilation opening 7. The opposite end wall 8 of the cylinder 2 and the piston 3 together define an expansion chamber 9 in which a pyrotechnic charge 10 with a detonator (not shown) is placed. The charge 10 is preferably exploded by retardation-sensitive means, which are known per se and therefore not shown in more detail here. The cylinder wall in the area of the expansion chamber 9 is made with an opening 11 leading to a valve device 12. Through this opening 11, propellant gas in the expansion chamber can escape to the environment.

Figure 1B:
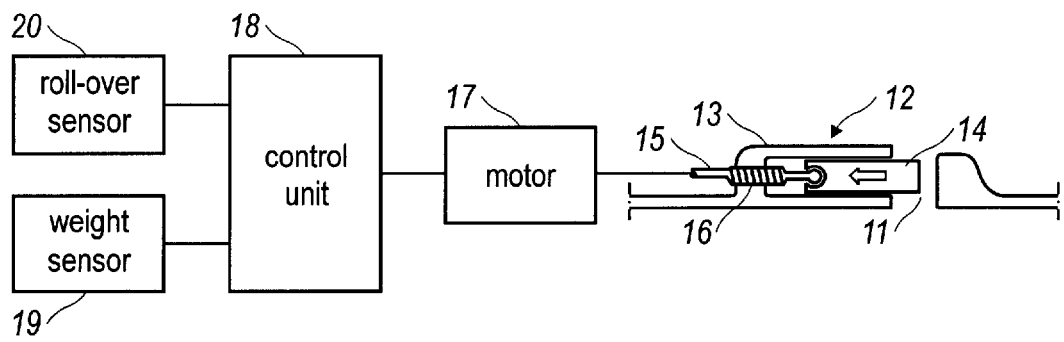
FIG. 1b shows an enlargement of the valve in FIG. 1a with associated means for controlling the valve.

The valve device 12 (illustrated more fully in FIG. 1b) has a valve slide 14 displaceable in a housing 13, joined to a rotatable set screw 15 in a threaded bore 16 in the housing. The set screw 15 is rotatable with the aid of a servomotor 17. The servomotor 17 is controlled by an electronic control unit 18 based upon one or more signals. These signals may include, for example, a signal from a weight-sensitive sensor 19, which in one embodiment can be built into the weight-bearing portion of the vehicle seat (not shown) for registering the weight of the person sitting in the seat. The signals may further include a signal from a roll-over sensor 20 that senses if the vehicle is about to end up upside-down.

At the end of the piston rod 4 there is a pulley or roller 21. On either side of the cylinder 2 there are at least two additional rollers 22, 23 over which runs a closed cable loop 24. Two portions or parts 24a, 24b of the loop converge in a single portion or cable 25, which is joined to a drum 26 (see, FIGS. 2–5).

The drum 26, via a planetary gear set 27, is arranged to drive a reel mechanism, which is known per se and is generally designated 28, as will be described below. By this arrangement of a pushing piston rod instead of a pulling piston rod, one opening in the end wall 8 on the expansion chamber side of the piston 3 is eliminated. Arranging the cable loop 24 around the piston 3 assures that there will be a symmetrical load on the piston rod 4.

Once all passengers are seated and the driver turns the ignition key, the sensors 19 and 20 cooperating with the control unit 18 are activated. The control unit 18, via the servomotor 17, sets the valve slide 14 to a position that is calculated to provide the optimal catch sequence for the occupant. The relationship between the occupant's weight and the size of the valve opening 11 can be either predetermined by tests, and the values stored in the control unit 18, or can be calculated based upon the sensed weights with the opening 11 adjusted based upon the calculated value. Generally, the higher the weight, the less the valve opening. If the roll-over sensor indicates that the vehicle is about to end up upside-down, the control unit 18 closes the valve 12, fixing the reel mechanism 28 in its pretensioning position by blocking the piston 3. The lack of a piston rod opening in the expansion chamber 9 assures that gas cannot leak out and change the position of the piston.

Figure 2:
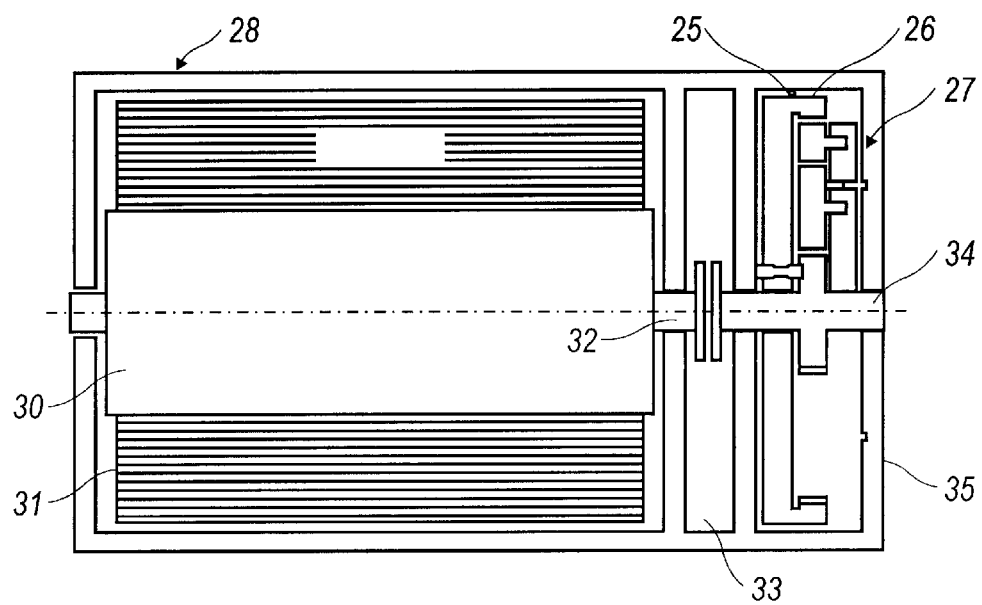
FIG. 2 shows a schematic longitudinal section through a reel mechanism with a first embodiment of a planetary gear set.

FIG. 2 illustrates the planetary gear set 27 and the reel mechanism 28. The latter is of a type known per se and has a belt cylinder 30 with a belt web 31 wound up on the cylinder 30. The cylinder 30 has a shaft 32 that, via a web jerk and compartment retardation sensitive retractor mechanism 33 (indicated only schematically here), is joined joined to a shaft 34 of the planetary gear set 27, shown in greater detail in FIGS. 3a, 3b, 4a and 4b. The shaft 34 is rotatably mounted in a housing 35, which can either be solidly joined or made in one piece with the housing 35 in which the belt cylinder shaft 32 is mounted. In this manner, the housing 35 is solidly mounted in the vehicle.

Referring to FIGS. 3a, 3b, 4a and 4b, the planetary gear set shaft 34 carries a sun gear 36. The sun gear 36 is able to engage with one or more first planet gears 38 carried by a planet carrier 37. The planet gears 38 are able to engage with one or more second planet gears 39 carried by a planet carrier. The second planet gears 39 are able to engage with a toothed rim 40 on the interior of the drum 26, forming the ring gear of the planetary gear set 27. A first blocker or blocking means in the form of a spring 41 loaded pin 42 in the end wall of the drum is provided. The pin 42 extends into a cavity 43 in the sun gear 36, enabling the ring gear 40 and also the drum to be locked to the sun gear 36. In another embodiment, a further blocker or blocking means is provided in the form of a second pin 45 loaded by a snap-spring 44 and disposed in a bore in the planet gear carrier 37. By projecting the pin 45 into a cavity 46 in the housing 35, the planet gear carrier 37 can be locked to the housing 35.

Figure 3A:
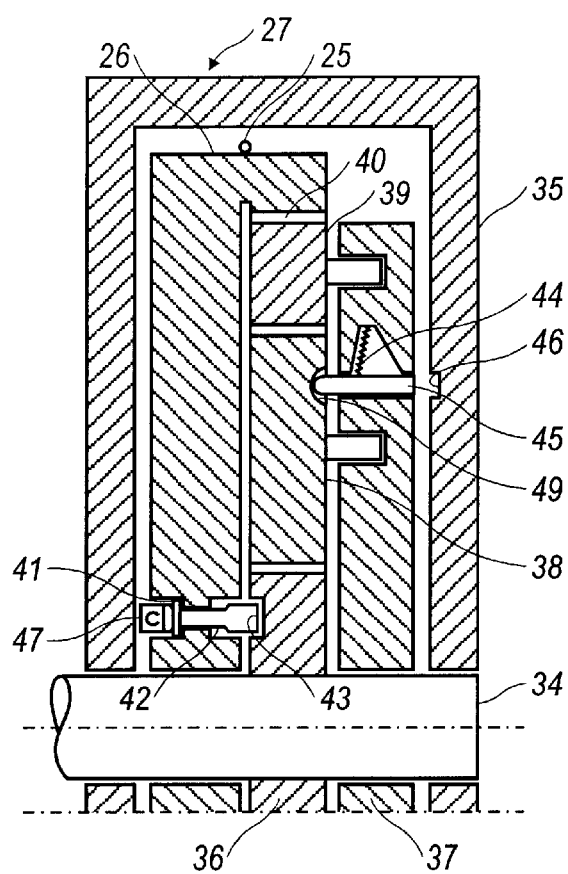
FIG. 3a shows a partial enlargement of the planetary gear set in FIG. 2 with associated blocking means in the pretensioning position.
Figure 3B:
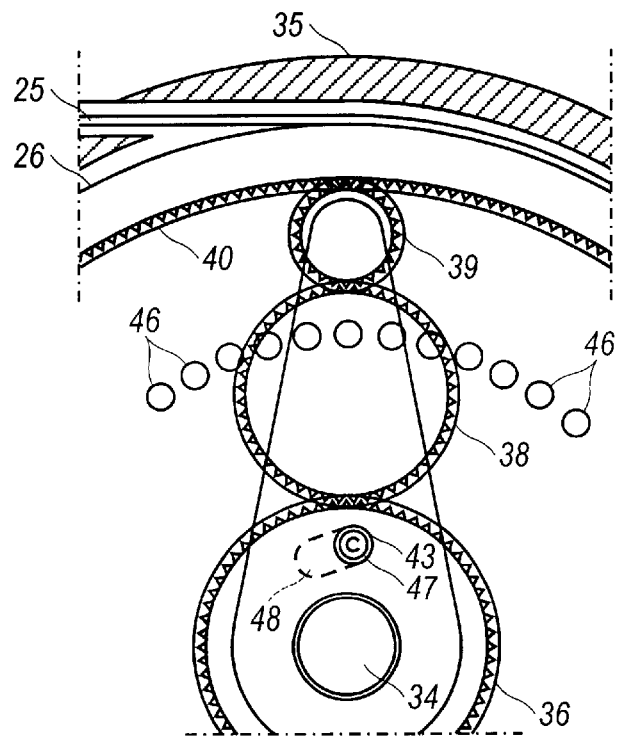
FIG. 3b shows a schematic side view of the gear set in FIG. 3a, FIG. 4a shows a partial enlargement of the planetary gear set in FIG. 2 with associated blocking means in the force-limiting position.

The starting position is illustrated in FIGS. 3a and 3b. In this position, the pin 42 locks the sun gear 36 to the ring gear 40, providing a gear ratio of about 1:1 between the shaft 34 and the drum 26. The pin 42 is kept in position by a cylindrical body 47, which is held in an arcuate groove 48 in the end wall of the drum 26.

In a collision, the retractor mechanism 33 locks together the shaft 32 of the bobbin and the planetary gear set 27 when the charge 10 in the cylinder expansion chamber 9 is detonated. The cable 25, which is joined to and is somewhat wound up on the drum, then turns the drum an angle dependent on the length of stroke of the piston 3 and the diameter of the drum 26. In this manner, the belt web 31 is pretensioned so that the slack of the web windings on the cylinder 30 is taken up and the belt tightened against the occupant, with the tightening sequence determined by the setting of the valve 12.

Figure 4A:
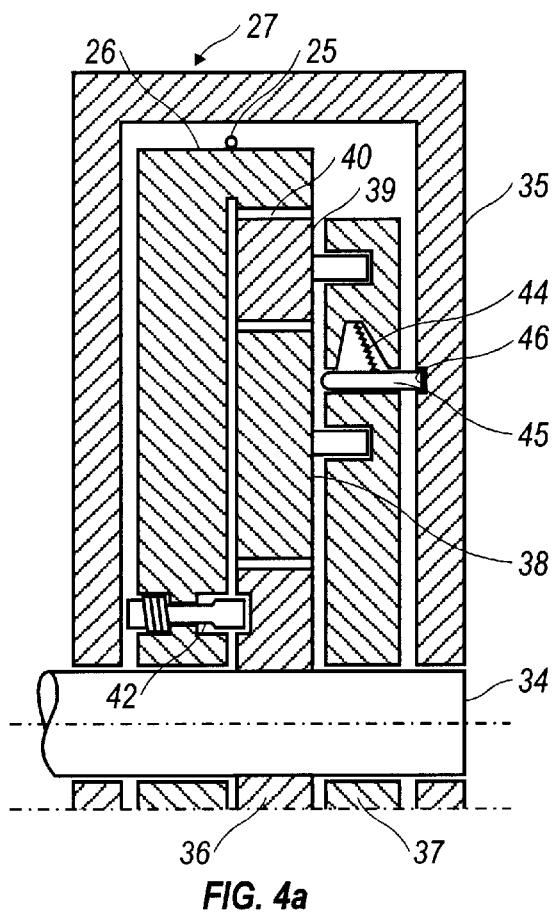
FIG. 4b shows a schematic side view of the gear set in FIG. 4a, FIG. 5 shows a schematic longitudinal section through a second embodiment of a planetary gear set.
Figure 4B:
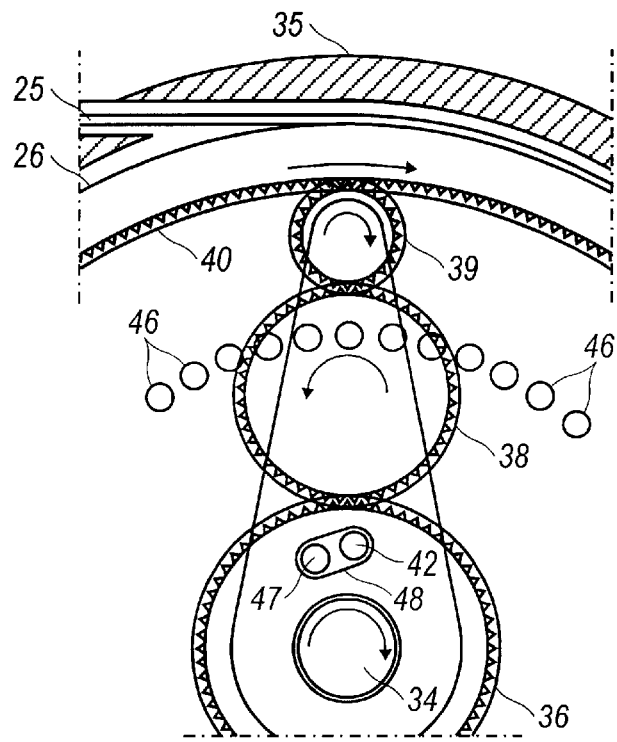

When the piston 3 has reached its end position in the cylinder 2, the pretensioning is completed. The forces on the belt web then change directions as the occupant loads the belt during the retardation. This also reverses the torque direction in the planetary gear set, thereby initiating the force-limiting stage illustrated in FIGS. 4a and 4b. The shaft 34 with the sun gear 36 begins to rotate in a direction opposite to the original pretensioning direction. The cylindrical body 47, held by the friction against the housing 35 under the influence of the spring 41, is displaced in the groove 48 to the position shown in FIG. 4b. The spring 41 can move the pin 42 out of the cavity 43, as is shown in FIG. 4a. The sun gear 36 can now rotate relative to the drum 26. Torque is transmitted from the sun gear 36 to the planet gears 38, 39 and planet gear carrier 37, prompting an initial relative movement between the first planet gear 38 and the planet gear carrier 37. The pin 45, which during the pretensioning stage was kept with its end inserted into a flanked depression 49 in the first planet gear 38 under the force of the snap-spring 44, will now be pressed towards the planet gear carrier 37. The carrier 37 is provided along a circle directly opposite the pin with a plurality of uniformly spaced depressions 46. The snap-spring 44 will snap the opposite end of the pin 45 into one of the depressions 46, locking the planet gear carrier 37 to the housing 35. Thereby, there will be a gear ratio between the shaft 34 of the planetary gear set and its ring gear 40 corresponding to the relationship between the number of teeth on the sun gear 36 and the ring gear 40. A similar ratio is obtained between the return stroke of the piston and the feed-out length of the belt. The force by which this process occurs is determined by the setting of the valve 12 and, thus, adapted to the occupant's weight.

Figure 6:
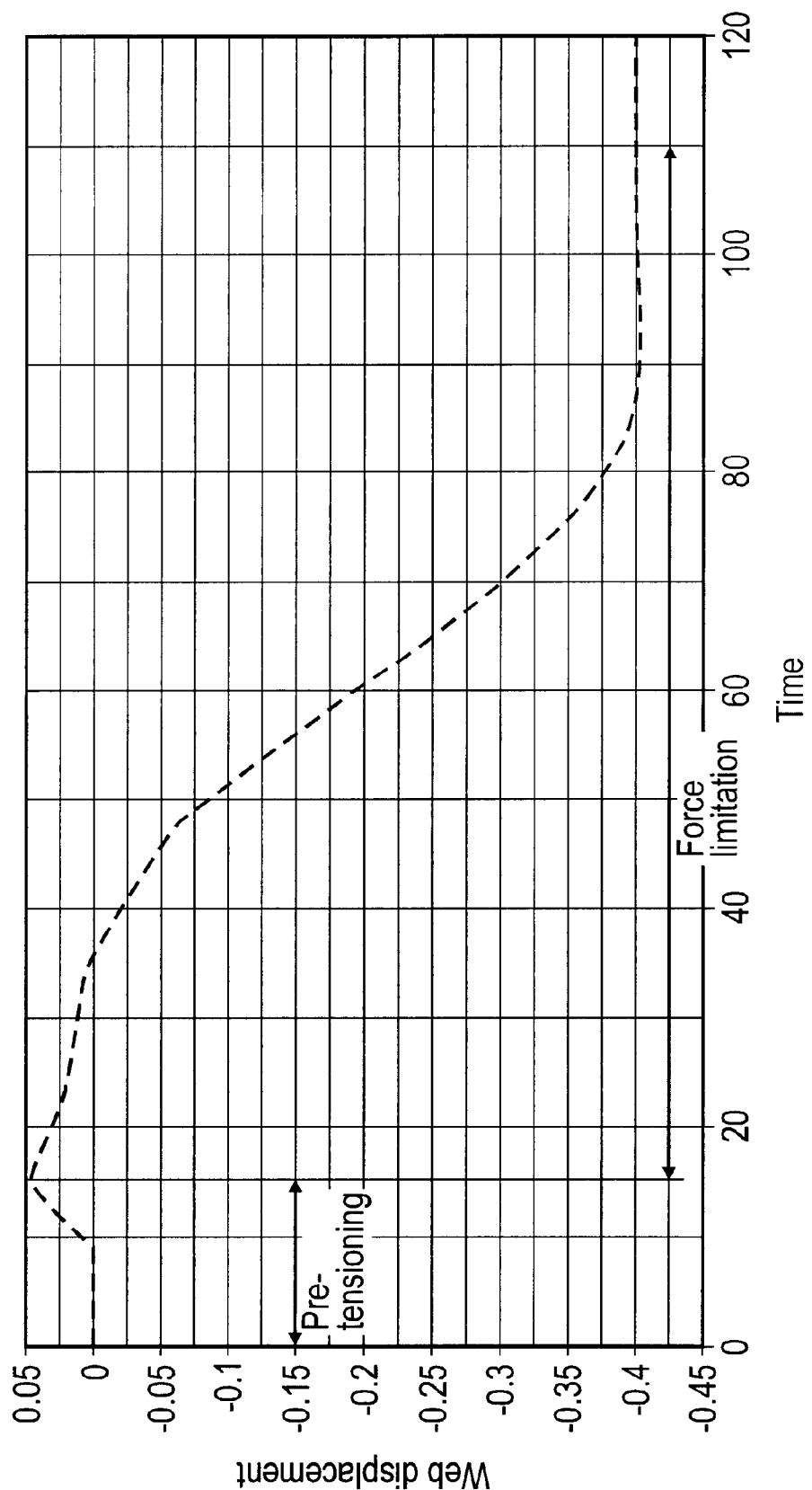
FIG. 6 shows a diagram of the web displacement as a function of time during the pretensioning and force-limiting stages.

According to one embodiment of the invention, the belt displacement as a function of time is illustrated in FIG. 6. As can be seen from the diagram, during the pretensioning phase the belt is pulled in up to about 5 cm in approximately 15 ms. Thereafter, the belt is fed out during the force-limiting phase about 45 cm in approximately 75 ms. This implies that the entire belt displacement process takes approximately 90 ms, and that the gear ratio in the planetary gear set is approximately 9:1, if the diameter of the drum and the medium diameter of the fed out web windings from the cylinder 30 are approximately equal.

Figure 5:
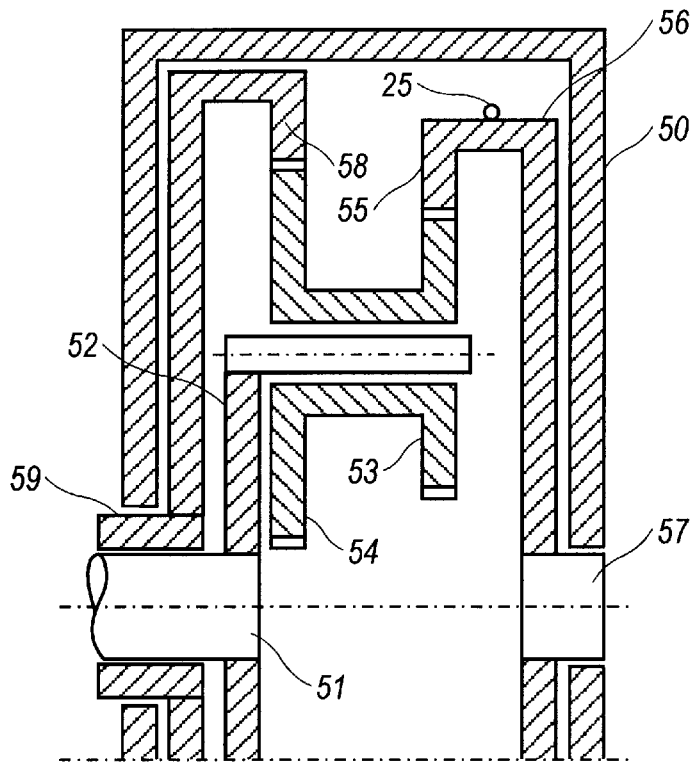

In order to obtain a large gear ratio in the planetary gear set without incurring a drum diameter so large that space problems are created, it is preferable to arrange the gearing in two steps. One example of such a planetary gear set is shown in FIG. 5. The gear set has a housing 50 in which a first shaft 51 is rotatably mounted. The shaft 51 carries a planet gear carrier 52 on which first and second planet gears 53, 54, solidly joined to each other, are mounted. A first ring gear 55, disposed on the inside of a drum 56 joined to the cable 25, is joined to a second shaft 57 mounted in the housing. The first ring gear 55 is able to engage the first planet gears 53. A second ring gear 58 is able to engage the second planet gears 54 and is joined to a sleeve 59 mounted concentrically in the housing with the first shaft 51. The shaft 51 is connectable to the belt cylinder shaft 32 with the aid of a belt jerk and passenger compartment retardation-sensitive retractor mechanism (not shown in more detail here).

With the aid of a blocker or blocking means (not shown in more detail here), for example, one-way clutches, saw tooth blocking mechanisms or snap-locks of a type known per se, the first shaft 51 can be locked during the pretensioning phase relative to the second shaft 57, thereby establishing a gear ratio of about 1:1. During the force-limiting phase, the second ring gear 58 can be locked to the housing 50 while the shafts 51 and 57 are released relative to each other, thus providing a high gear ratio between the shafts 51 and 57.

The present invention makes possible a substantially accurate adaptation of the catching phase to the weight of the occupant, both during the belt pretensioning phase and during the force-limiting phase during the subsequent belt feed-out. By having a long belt feed-out, it is possible to optimize the force-limiting phase. Finally, the arrangement makes possible a roll-over function by virtue of the fact that the valve can be closed after the pretensioning phase so that the occupant is held securely in his seat.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the accompanying claims.

What is claimed is:

1. A device for pretensioning and force-limiting a safety belt web joined to a reel mechanism in a vehicle, the device comprising:

a cylinder, a piston displaceable in the cylinder and having a piston rod, the piston rod joined to one side of the piston and extending through an opening in a first end wall of the cylinder, a motion-transmitting element acting between the piston rod and the reel mechanism, said element achieving rotation of the reel mechanism in a winding-up direction of the belt web upon displacement of the piston in one direction, a pyrotechnic charge causing, when detonated, a pressure increase in a cylinder chamber between the piston and a second end wall of the cylinder whereby the piston is displaced in said one direction, wherein the motion-transmitting element is joined to a ring gear of a planetary gear set so that displacement of the piston in the cylinder results in rotation of the ring gear, wherein the planetary gear set is so disposed and coupled to the reel mechanism that the gear ratio between the ring gear and the reel mechanism is about 1:1 upon rotation of the ring gear in the winding-up direction of the web, wherein the planetary gear set is so structured that the gear ratio between the ring gear and the reel mechanism is higher when rotating in an opposite direction, whereby a return movement of the piston over a certain distance in the cylinder corresponds to a several times longer feed-out of the web from the reel mechanism.

2. The device according to claim 1, further comprising a drum solidly joined to the ring gear of the planetary gear set, wherein the motion-transmitting element is elongated and flexible and is joined to and partially wound up on the drum.

3. The device according to claim 2, wherein the ring gear is on an inside of the drum and the planetary gear set further comprises a sun gear with a shaft able to be coupled together with a shaft in the reel mechanism, the device further comprising a first blocker for, upon rotation of the drum in the winding-up direction of the web, locking the drum and the sun gear together and, upon rotation in the opposite direction, releasing the sun gear from the drum, and a second blocker for blocking rotation of a planet gear carrier of the planetary gear set upon rotation in the opposite direction.

4. The device according to claim 2, wherein the ring gear is on an inside of the drum and engages at least one first planet gear on a planet gear carrier, the carrier coupled with a shaft in the reel mechanism, the device further comprising at least one second planet gear on the planet gear carrier that is solidly joined to the first planet gear and engages a second ring gear.

5. The device according to claim 1, wherein the cylinder chamber further comprises an outlet communicating with a spill valve, the spill valve able to be set between various degrees of opening.

6. The device according to claim 5, wherein the spill valve is continuously adjustable between various degrees of opening and a closed position.

7. The device according to claim 6, further comprising a sensor for sensing the weight of an occupant, a control unit, and a servo unit, wherein the spill valve further comprises a valve element able to be set by the servo unit, the servo unit being controlled by the control unit based on signals from the sensor.

8. The device according to claim 7, wherein the cylinder chamber comprises an area between the side of the piston opposite to the piston rod and the second end wall of the cylinder, wherein the motion-transmitting element rotates the reel mechanism in the winding-up direction of the belt web when the piston is displaced in said one direction, wherein the control unit is in communication with a positional sensor that senses the position of the vehicle, and wherein the control unit closes the spill valve upon a signal from the positional sensor indicating that the vehicle is about to end up upside-down.

* * * * *